: Patented Oct. 7, 1952

2,613,207

UNITED STATES PATENT OFFICE 2,613,207

3-TRICHLOROMETHYLSULFENYL-5-ARALKYLIDENE-2,4-THIAZOLIDINEDIONES

Chien-Pen Lo, Philadelphia, Pa., Elwood Y. Shropshire, Moorestown, N. J., and Willard J. Croxall, Bryn Athyn, Pa., assignors to Rohm & Haas Company, Philadelphia, Pa., a corporation of Delaware No Drawing. Application November 24, 1950, Serial No. 197,490

5 Claims. (Cl. 260—240)

This invention relates to 3-trichloromethylsulfenyl-5-aralkylidene-2,4-thiazolidinediones of the formula

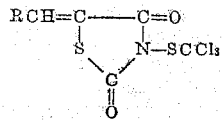

wherein R is an aryl or arylaliphatic group. These compounds are interesting pesticidal agents. Typical groups appearing as R include phenyl, methylphenyl, ethylphenyl, butylphenyl, octylphenyl, nonylphenyl, dimethylphenyl, methoxyphenyl, ethoxyphenyl, bromophenyl, chlorophenyl, nitrophenyl, acetylphenyl, butyrylphenyl, phenylethenyl, methylphenylethenyl, chlorophenylethenyl, nonylphenylethenyl, 4-phenyl-1,3-butadienyl, or other such groups having a total of preferably not over 18 carbon atoms.

There have been prepared 5-benzal-2,4-thiazolidinediones in which the phenyl group of the benzal substituent may be unsubstituted or it may carry a variety of groups or atoms, such as nitro, alkoxy, alkyl, chloro, bromo, etc. Arylalkenyl derivatives are also known such as 5-cinnamal-2,4-thiazolidinedione. These known types of compounds form starting materials for the compounds of this invention. As is known, these starting materials are formed by condensation of an aromatic aldehyde and 2,4-thiazolidinedione, by acid hydrolysis of 5-aralkylidene pseudothiohydantoins, and by other methods.

The other reactant is a triochloromethylsulfenyl halide, the chloride being entirely suitable and economical but the bromide being also effective.

The two starting materials are most conveniently reacted in the presence of an organic solvent, such as carbon tetrachloride, ethylene dichloride, benzene, toluene, naphtha, acetone, or the like. An alkaline reagent is used for taking up hydrogen halide. An alkali metal hydroxide is satisfactory for this purpose. In one convenient procedure there is first formed an alkali metal salt of a 5-aralkylidene-2,4-thiazolidinedione. This is reacted with a trichloromethylsulfenyl halide to form a metal halide and the desired 3-trichloromethylsulfenyl-5-aralkylidene-2,4-thiazolidinedione.

Preparations of typical compounds of this invention are described in the following illustrative examples in which parts are by weight.

Example 1

The potassium salt of 5-benzal-2,4-thiazolidinedione was prepared by heating under reflux for about 16 hours a mixture of 50 parts of 5-benzal-2,4-thiazolidinedione and 13.8 parts of potassium hydroxide in ethanol. This reaction mixture was cooled with separation of a solid. This was filtered off, washed with ethanol, and dried. The dried product, amounting to 52 parts, was the desired potassium salt.

A mixture of 20 parts of this salt, 15.3 parts of trichloromethylsulfenyl chloride, and 240 parts of carbon tetrachloride was stirred for three hours. A solid product formed which was filtered off and was air-dried. It was 3-trichloromethylsulfenyl-5-benzal-2,4-thiazolidinedione, melting at 159°–161° C. and containing by analysis 3.9% of nitrogen and 28.4% of chlorine. Theoretical values are 3.95% and 30.0% respectively.

Example 2

The sodium salt of 5-o-chlorobenzal-2,4-thiazolidinedione was prepared by mixing 50 parts of 5-o-chlorobenzal-2,4-thiazolidinedione and sodium ethoxide solution, made from 48 parts of sodium dissolved in 275 parts of anhydrous ethanol, and heating this mixture on a steam bath for two hours. The reaction mixture was cooled. The solid which had formed was filtered off, washed with petroleum ether, and dried. This was the desired sodium salt.

There were mixed 49 parts of this sodium salt and 42 parts of trichloromethylsulfenyl chloride in 300 parts of chloroform. This reaction mixture was heated on a steam bath for several hours and filtered while hot. The filtrate was chilled and 160 parts of methanol added. A solid was precipitated. It was filtered off and, when dried in an oven, amounted to 47 parts. It melted at 141°–143° C. and contained 3.4% of nitrogen and 35.9% of chlorine, corresponding in composition to 3 - trichloromethylsulfenyl-5-o-chlorobenzal-2,4-thiazolidinedione.

Example 3

A mixture of 43.1 parts of 5-p-chlorobenzal-2,4-thiazolidinedione, 12 parts of potassium hydroxide, 200 parts of acetone, and 200 parts of water was stirred for two hours. There was then added 40 parts of trichloromethylsulfenyl chloride. The resulting reaction mixture was stirred for three hours. A solid formed. It was collected on a filter and washed with petroleum ether. The solid was twice recrystallized from chloroform to give a light yellow solid, amounting to 29 parts, melting at 170°–172° C., and containing 3.7% of nitrogen and 35.0% of chlorine. It was 3-trichloromethylsulfenyl-5-p-chlorobenzal-2,4-thiazolidinedione, for which theoretical values are 3.6% of nitrogen and 36.5% of chlorine.

*Example 4*

A mixture of 37.6 parts of 5-m-nitrobenzal-2,4-thiazolidinedione, 8.4 parts of potassium hydroxide, 250 parts of acetone, and 300 parts of water was stirred for four hours. Thereto was added 35 parts of trichloromethylsulfenyl chloride and the resulting mixture was stirred for two hours. Three hundred parts of water was then added. The solid which was present was filtered off and dried in an oven. It was recrystallized from chloroform to give 30 parts of a product which melted at 148°–150° C. and contained 7.2% of nitrogen and 26.0% of chlorine, corresponding in composition to 3-trichloromethylsulfenyl - 5-m-nitrobenzal-2,4-thiazolidinedione, which contains theoretically 7.0% of nitrogen and 26.7% of chlorine.

*Example 5*

A mixture of 26.1 parts of 5-p-butylbenzal-2,4-thiazolidinedione, 5.6 parts of potassium hydroxide, and 100 parts of ethanol was stirred and heated under reflux for four hours. The reaction mixture was cooled and filtered. The solid which was separated was rinsed with ethanol and dried. There were mixed 15 parts of the above solid salt, 10 parts of trichloromethylsulfenyl chloride, and 200 parts of ethylene dichloride. The mixture was heated on a steam bath, stirred for four hours, and filtered hot. The filtrate was cooled and the solid which formed was filtered off, washed with a little water, and dried. It was 3-trichloromethylsulfenyl-5-p-butylbenzal-2,4-thiazolidinedione, having the structure

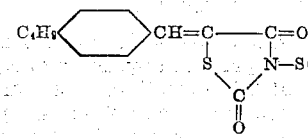

*Example 6*

A solution of four parts of sodium hydroxide in 50 parts of water was added to a mixture of 23.5 parts of 5-anisal-2,4-thiazolidinedione in 40 parts of acetone. At first a homogeneous solution was obtained, but in a short time a solid separated. The mixture was stirred and thereto was added 18.6 parts of trichloromethylsulfenyl chloride. Stirring was continued for three hours. The solid which was present was filtered off and recrystallized from chloroform. It then melted at 189°–190° C. The yield was 22 parts of 3-trichloromethylsulfenyl - 5 - p - methoxybenzal-2,4-thiazolidinedione. The product contained by analysis 3.7% of nitrogen and 26.9% of chlorine (theory 3.7% and 27.7% respectively).

*Example 7*

To a mixture of 37.4 parts of 5-piperonylidene-2,4-thiazolidinedione, 160 parts of acetone, and 100 parts of water there was added a solution of 8.4 parts of potassium hydroxide in 100 parts of water. The resulting mixture was stirred for 45 minutes. Then 30 parts of trichloromethylsulfenyl chloride was added and the reaction mixture was stirred for two hours. There was added water in an amount of 400 parts. A solid formed. It was filtered off and recrystallized from chloroform. The dried product amounted to 39 parts. It melted at 178°–179° C., contained 3.6% of nitrogen, and corresponded in composition to 3 - trichloromethylsulfenyl - 5 - piperonylidene-2,4-thiazolidinedione. This compound has the structure

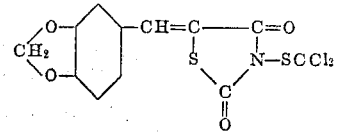

The compound as obtained contained 24.8% of chlorine.

*Example 8*

A mixture of 56 parts of 5-cinnamal-2,4-thiazolidinedione and a solution of sodium ethylate formed from 5.6 parts of sodium in 240 parts of anhydrous ethanol was heated under reflux overnight and then cooled. A solid formed and was filtered off. It was washed with petroleum ether and dried. This was the sodium salt of 5-cinnamyl-2,4-thiazolidinedione.

There were mixed with stirring 60 parts of this salt and 45 parts of trichloromethylsulfenyl chloride in 520 parts of chloroform. Stirring was continued for three hours. The mixture was warmed to give solution and filtered while hot. The filtrate was cooled. Crystals separated, were filtered off, were washed with petroleum ether and with methanol, and were dried. There was obtained a yield of 55 parts of 3-trichloromethylsulfenyl-5-cinnamal-2,4-thiazolidinedione, which melted at 173°–175° C. and contained 3.8% of nitrogen, 16.2% of sulfur, and 26.0% of chlorine. Corresponding theoretical values are 3.7%, 16.8%, and 28.0%, respectively.

This compound has the formula

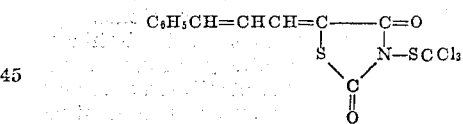

Compounds of this invention effectively inhibit the germination of spores of typical test fungi in standard fungitoxicity tests. For example, 3-trichloromethylsulfenyl-5-benzal-2,4 - thiazolidinedione when applied in aqueous suspensions at dilutions as low as 0.005% completely inhibited the germination of spores of *Sclerotinia fructicola*. There is obtained with the compounds of this invention an excellent degree of tenacity. Tenacity is determined by tests in which cellulose nitrate-coated plates are treated with a dilution of 0.01% of the compound under test and dried and are then subjected to a water spray for a measured period of time. The plates are then inoculated with spores, incubated, and examined for inhibition of germination. The tenacity, for example, of the above-named compound was found to be over 16 minutes, this being the longest period for which a water spray was applied.

Fungitoxicity tests with 5-o-chlorobenzal-2,4-thiazolidinedione showed complete inhibition of germination of *Macrosporium sarcinaeforme* at 0.1% of this compound and of *Sclerotinia fructicola* at 0.01%. With 5-p-chlorobenzal-2,4-thiazolidinedione at 0.001% there was 97% inhibition of germination of spores of *Sclerotinia fructicola*. The tenacity value was over 16 minutes. The cinnamal, nitro, anisyl, and piperonal derivatives each applied at 0.1% gave complete inhibition against both test organisms.

We claim:

1. As new chemical substances, compounds of the formula

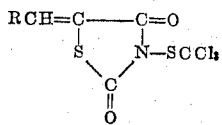

wherein R is a member of the class consisting of phenyl and phenylethenyl groups of not over 18 carbon atoms.

2. As a new chemical substance, a compound of the formula

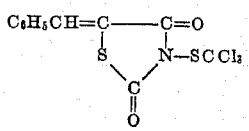

3. As a new chemical substance, a compound of the formula

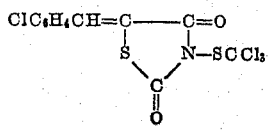

4. As a new chemical substance, a compound of the formula

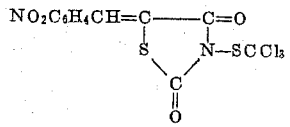

5. As a new chemical substance, a compound of the formula

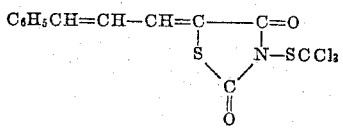

CHIEN-PEN LO.
ELWOOD Y. SHROPSHIRE.
WILLARD J. CROXALL.

REFERENCES CITED

The following references are of record in the file of this patent:

Chemical Engineering News, p. 1062, March 27, 1950.